United States Patent Office 3,600,356
Patented Aug. 17, 1971

3,600,356
LIQUID CURING AGENTS FOR POLYEPOXIDES COMPRISED OF A MIXTURE OF ISOMERS OF TETRAHYDROPHTHALIC ANHYDRIDE AND HEXAHYDROPHTHALIC ANHYDRIDE
Koichi Murai, Kyoto-fu, and Giichi Akazome, Yasuto Murakami, Koichi Tabata, Yoshio Oka, and Akira Fujita, Kyoto-shi, Japan, assignors to New Japan Chemical Company Limited, Kyoto-shi, Japan
No Drawing. Filed Mar. 24, 1969, Ser. No. 809,982
Claims priority, application Japan, Apr. 6, 1968, 43/22,976
Int. Cl. C08g 30/12
U.S. Cl. 260—47  3 Claims

ABSTRACT OF THE DISCLOSURE

A liquid curing agent for polyepoxide which comprises a mixture of the isomers of tetrahydrophthalic anhydride having a solidifying point of 5 to 20° C. and 5 to 60 weight percent of hexahydrophthalic anhydride, based on the combined weight of said isomer mixture and hexahydrophthalic anhydride.

This invention relates to improved curing agents for epoxide resins and epoxide resin compositions containing the same.

It is well known in the art that carboxylic acid anhydrides are efficient curing agents for polyepoxides and various anhydride curing agents have been proposed. Such known curing agents are classified into two types, solid one and liquid one, of which the latter is preferred for the reason that it can be mixed with polyepoxides more easily than solid one.

As a liquid curing agent methyl-endomethylenetetrahydrophthalic anhydride is known in the art, but when it is mixed with polyepoxides the viscosity of the resultant mixture increases considerably, making it difficult to further mix with other additives, such as fillers, pigments, etc. and to mold it into desired shape without heating. In British Pat. No. 914,463 is disclosed that mixtures of the isomers of tetrahydrophthalic anhydride are efficient liquid curing agent for polyepoxides. However, such mixtures of the isomers still have a relatively high solidification point or melting point of 5 to 20° C., and therefore they tend to solidify or increase their viscosity in colder seasons, particularly in winter, making it impossible to admix them with polyepoxides unless heated prior to the mixing.

Main object of the invention is accordingly to provide a liquid curing agent for polyepoxides which makes it possible to admix with polyepoxide without heating even in winter season. Another object of the invention is to provide a curing polyepoxide composition containing a polyepoxide and liquid curing agent, which has a viscosity as low as it can easily be mixed with other additives and molded into desired shape without heating.

These and other objects of the invention will be apparent from the following description.

The liquid curing agent of the invention comprises a mixture of the isomers of tetrahydrophthalic anhydride and 5 to 60 weight percent of hexahydrophthalic anhydride, based on the combined weight of said isomer mixture and hexahydrophthalic anhydride.

The present curing agent as above has an extremely low solidification point of less than —5° C. and is in a liquid form free from solidification and undesired increase of the viscosity even in winter season.

The polyepoxides used in the invention are those aliphatic, cycloaliphatic or aromatic compounds containing on the average at least two epoxide group per molecule. The epoxide group in the molecule may be terminal or interior.

As disclosed in British Pat. No. 914,463 a mixture of the isomers of tetrahydrophthalic anhydride is obtained by heating the anhydride in the presence of an acid catalyst. By this heating all four possible isomers may be produced in various proportions in accordance with the reaction conditions applied. Thus by the choice of the conditions isomer mixtures containing four kinds of isomers in various proportions and having different solidification points can be obtained. In this invention it is essential to use an isomer mixture having a melting point of 5 to 20° C. which is obtainable by suitable choice of the reaction conditions.

The isomer mixture having above melting point tends to solidify in winter season. However, according to the researchers of the present inventors it has been found that when hexahydrophthalic anhydride having a melting point of 35° C. is added thereto in the specific amount the resultant mixture keeps liquid form even in winter season free from solidification and undesired increase of the viscosity.

The liquid curing agent of the invention comprises isomer mixture of tetrahydrophthalic anhydride having added thereto hexahydrophthalic anhyride in the range of 5 to 60 weight percent, based on the combined weight of the isomer mixture of tetrahydrophthalic anhydride and hexahydrophthalic anhydride. Less or larger amount of hexahydrophthalic anhydride results in the mixture which solidifies or increases the viscosity thereof in winter season. Preferable amount of hexahydrophthalic anhydride is in the range of 10 to 50 weight percent, based on the combined weight of the isomer mixture and hexahydrophthalic anhydride.

The liquid curing agent of the invention is incorporated in polyepoxides in the proportion of at least one equivalent of the anhydride to one equivalent of the epoxy group in the polyepoxides, to produce epoxy resin composition. The curing agent is usually used up to two times equivalent of the anhydride to the epoxy groups in the polyepoxides, though greater amount thereof may be used. As the present curing agent has good compatibility with polyepoxides and low viscosity at any ambient temperature, it can easily be admixed with polyepoxides at room temperatures even in winter season. The resultant resin composition has a long pot-life of more than two months and a low viscosity at room temperatures.

The curing of the resin composition is effected by incorporating accelerators in the composition and heating the mixture. In the invention any of known accelerators may be used, which include, for example, organic amines, such as benzyldimethylamine, 2,4,6-tris-[N,N-dimethylaminomethyl]-phenol, diethanol amine, diethylenetriamine, triethylamine, etc. and Lewis acids, such as $FeCl_3$, $AlCl_3$, $ZnCl_2$, $BF_3$-amine complex, etc. The accelerators may be used in the range of 0.01 to 10 weight percent, based on the weight of the polyepoxides in the composition.

For better understanding of the invention examples are given below, in which all parts and percentage are shown by weight.

EXAMPLE 1

In nitrogen atmosphere 100 parts of $\Delta^4$-tetrahydrophthalic anhydride was heated in the presence of one part of phosphorous pentoxide at 210° C. for 30 minutes. Distillation of the resultant mixture under reduced pressure gave a light-yellow substance having a solidification point of 18° C. and a viscosity of 30 cst. (20° C.). The substance consisted of $\Delta^4$-, $\Delta^3$-, $\Delta^2$- and $\Delta^1$-tetrahydrophthalic anhydrides in the proportion of about 10, 50, 15 and 25 percent respectively.

The isomer mixture thus obtained was mixed with hexahydrophthalic anhydride in a 1:1 weight ratio, whereby liquid curing agent having the following characteristics was obtained.

Solidification point: −28° C.
Color (Gardner): 1
Viscosity (at 20° C.): 25 cst.

The resultant liquid curing agent was mixed with "Epikote 828" (trademark, polyepoxide) in the proportion of 0.8 mole of the anhydride per epoxy equivalent of the resin, whereby resin composition having the following characteristics was obtained. Epikote 828 is a glycidyl ether resin from bisphenol A and epichlorhydrin having an epoxide equivalent of 180–200, sold by Shell Chemical Company. Ltd.

Viscosity (at 20° C.): 200 cst.
Color (Gardner): Less than 1
Pot-life: More than 2 months

Comparison 1

For comparison known liquid curing agent, methylendomethylene-tetrahydrophthalic anhydride was mixed with "Epikote 828" in the same manner as in Example 1 above, whereby the resin composition having the following characteristics was obtained.

Viscosity (at 20° C.): 600 cst.
Color (Gardner): Less than 1
Pot-life: More than 2 months

EXAMPLE 2

To the resin compositions of Example 1 and Comparison 1 were added the following accelerators respectively in a proportion of 1 percent, based on the weight of the polyepoxide, whereby the compositions having initial viscosities shown in Table 1 below were obtained.

TABLE 1

| No. | Resin composition | Accelerator | Initial viscosity [1] |
|---|---|---|---|
| 1 | Example 1 | | 160 |
| 2 | do | 2,4,6-tris-[N,N-dimethylaminomethyl]-phenol | 170 |
| 3 | do | Benzyldimethylamine | 180 |
| 4 | do | Triethylamine | 370 |
| 5 | Comparison 1 | | 550 |
| 6 | do | 2,4,6-tris-[N,N-dimethylaminomethyl]-phenol | 710 |
| 7 | do | Benzyldimethylamine | 700 |
| 8 | do | Triethylamine | 1,020 |

[1] Centistokes at 30° C.
NOTE.—Viscosity was measured by using Brookfield viscometer.

The composition No. 3 in Table 1 above was heated at 100° C. for one hour and further heated at 150° C. for 4 hours to effect the curing of the polyepoxide. The cured resin thus obtained had a flexural strength of 18,200 p.s.i., tensile strength of 12,000 p.s.i. and heat distortion temperature of 120° C. These characteristics were measured in accordance with the following methods:

Fexural strength: ASTM D 790–63
Tensile strength: ASTM D 638–61 T
Heat distortion temperature: ASTM 648–56

EXAMPLE 3

$\Delta^4$-tetrahydrophthalic anhydride was heated in the same manner as in Example 1 except that the heating was continued for one hour, producing a mixture of the isomers of tetrahydrophthalic anhydride. The mixture consisted of $\Delta^4$-, $\Delta^3$-, $\Delta^2$- and $\Delta^1$-tetrahydrophthalic anhydrides in the proportion of 10, 35, 4.5 and 50.5 percent respectively and has a solidification point of 9° C. and a viscosity of 30 cst. at 20° C.

The isomer mixture thus obtained was mixed with hexahydrophthalic anhydride in a weight ratio of 65:35, whereby liquid curing agent having the following characteristics was obtained.

Solidification point: −24.3° C.
Color (Gardner): Less than 1
Viscosity (at 20° C.): 25 cst.

80 parts of the resultant liquid curing agent was mixed with 100 parts of "Araldite GY 252" (trademark, polyepoxide) and 1 part of benzyldimethylamine, whereby resin composition having an initial viscosity of 350 cst. at 30° C. was obtained. Araldite GY 252 is a glycidyl ether resin from bisphenol A and epichlorhydrin, having an epoxide equivalent of 184–194, sold by Ciba Ltd. The composition thus obtained was heated at 80° C. for 4 hours and further at 120° C. for 8 hours to effect the curing of the polyepoxide. The cured resin thus obtained had a flexural strength of 18,500 p.s.i., tensile strength of 11,500 p.s.i. and heat distortion temperature of 119° C.

EXAMPLE 4

$\Delta^4$-tetrahydrophthalic anhydride was heated in the same manner as in Example 1 except that it was heated at 230° C., producing a mixture of the isomers of tetrahydrophthalic anhydride. The mixture consisted of $\Delta^4$-, $\Delta^3$-, $\Delta^2$- and $\Delta^1$-tetrahydrophthalic anhydrides in the proportion of about 8.6, 33.2, 3.8 and 54.4 percent respectively and had a solidification point of 6.2° C. and a viscosity of 25 cst. at 25° C.

The isomer mixture thus obtained was mixed with hexahydrophthalic anhydride in a 95:5 weight ratio, whereby liquid curing agent having the following characteristics was obtained:

Solidification point: −28° C.
Color (Gardner): Less than 1
Viscosity (at 20° C.): 25 cst.

80 parts of the resultant liquid curing agent was mixed with 100 parts of "Dow Epoxide DER 332" (trademark, polyepoxide) and one part of 2,4,6-tris-[N,N-dimethylaminoethyl]-phenol, whereby resin composition having an initial viscosity of 65 cst. at 30° C. was obtained. Dow Epoxide 332 is a glycidyl ether-type resin, having an epoxide equivalent of 172–176, sold by Dow Chemical Co., Ltd. The composition thus obtained was heated at 80° C. for 4 hours and further at 120° C. for 8 hours to effect the curing of the polyepoxide. The cured polyepoxide had a fluxural strength of 20,300 p.s.i., tensile strength of 11,800 p.s.i. and heat distortion temperature of 127° C.

What we claim is:

1. A liquid curing agent for a polyepoxide containing on the average at least two 1,2-epoxide groups per molecule which consisting essentially of a mixture of the isomers of tetrahydrophthalic anhydride having a solidifying point of 5 to 20° C. and 5 to 60 weight percent of hexahydrophthalic anhydride, based on the combined weight of said isomer mixture and hexahydrophthalic anhydride.

2. The liquid curing agent for a polyepoxide containing on the average at least two 1,2-epoxide groups per molecule according to claim 1, in which said hexahydrophthalic anhydride is contained in the amount of 10 to 50 weight percent, based on the combined weight of said isomer mixture and hexahydrophthalic anhydride.

3. An epoxy resin composition which comprises a polyepoxide containing on the average at least two 1,2-epoxide groups per molecule and said liquid curing agent claimed in claim 1.

References Cited

UNITED STATES PATENTS 3,245,916  4/1966  Woskow _____ 252—182

FOREIGN PATENTS 914,463  1/1963  Great Britain _____ 260—47EP

WILLIAM H. SHORT, Primary Examiner

T. E. PERTILLA, Assistant Examiner

U.S. Cl. X.R.

252—182; 260—78.4